ALLAN E. REID, OF PROVIDENCE, RHODE ISLAND, ASSIGNOR TO EUGENE F. BOWEN, OF PROVIDENCE, RHODE ISLAND.

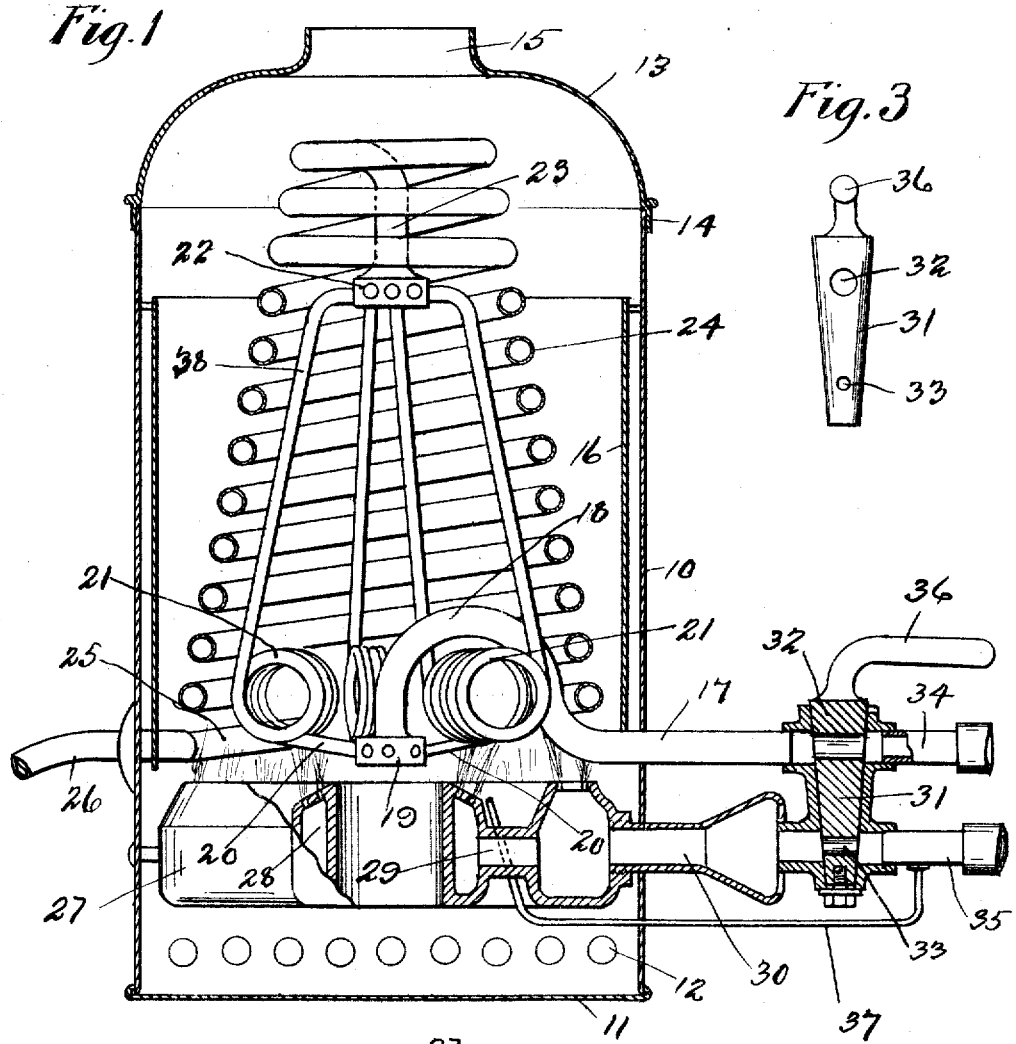
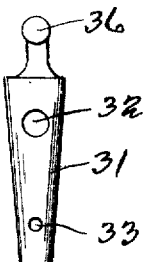
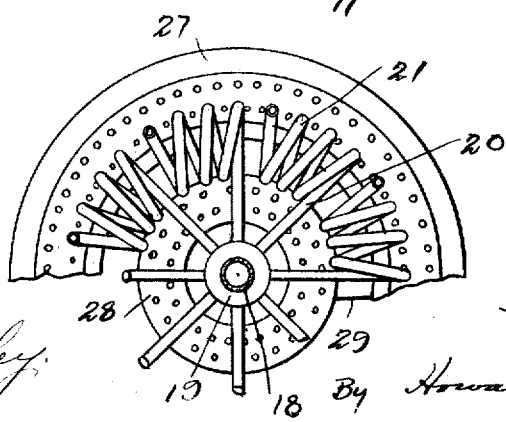

PORTABLE WATER-HEATER.

1,271,487.

Specification of Letters Patent.

Patented July 2, 1918.

Application filed February 5, 1916. Serial No. 76,257.

*To all whom it may concern:*

Be it known that I, ALLAN E. REID, a citizen of the United States, and resident of the city of Providence, in the county of Providence and State of Rhode Island, have invented certain new and useful Improvements in Portable Water-Heaters, of which the following is a specification.

This invention relates to portable water heaters, and has for its object to provide a heater of high efficiency, the same having a main coil and a plurality of auxiliary coils being connected together, the whole of each of said auxiliary coils being located in proximity to the burner, whereby the water is quickly heated to a high degree in them and that before entering the main coil, to prevent water of condensation collecting on the outer surface of the latter coil, thereby raising the heating efficiency of the system.

A further object of the invention is to provide a burner having a plurality of spaced apart series of flame jets, said jets being so arranged that the spaces between them is located beneath a portion of said auxiliary coils so that the drip from said coils will fall through said space to the receptacle below instead of falling onto the burner and so reduce the effectiveness of the fire.

A still further object of the invention is the provision of means whereby the operation of but a single element controls the flow of both the water and the gas to the heater.

The invention further consists in providing means in the flow controlling element, whereby the water inlet is opened in advance of and closed after the gas inlet, so as to positively insure the coil being filled before the heat is turned on to prevent injury to the apparatus.

With these and other objects in view, the invention consists of certain novel features of construction, as will be more fully described, and particularly pointed out in the appended claims:

In the accompanying drawings.

Figure 1— is a sectional elevation of my improved heater illustrating the general arrangement of the mechanism therein.

Fig. 2— is a plan view showing a portion of the burner and the general arrangement of the different auxiliary coils and their location relative to the burner.

Fig. 3— shows a plug valve having two ports through it whereby it is enabled to control the flow of both the water and the gas.

Referring to the drawings 10 designates the casing of the heater which is preferably made of thin sheet metal and in cylindrical form, the same being provided with a bottom portion 11 rolled onto the lower edge thereof, thereby forming a receptacle to catch the drip from the coils. Around the lower portion of this casing is formed a series of draft holes 12. The upper portion of this cylindrical casing is provided with a cap member 13, which fits over the same at 14 and whose upper end is open as at 15 to provide a vent for the burned gases. On the inner side along the body portion of the casing is located an inner protecting cylinder 16 spaced apart from the outer cylinder to prevent the heat from discoloring the latter.

The water inlet pipe 17 enters through the casing and is curved up over the coils and then downward into a goose neck shape 18 having a header 19 at its lower end. A plurality of small tubes 20, see Fig. 2, lead out radially from this header and each is wound into a series of convolutions as at 21 substantially filling the spaces between it and the beginning of the next coil in the casings. Each of these coils, it will be noted, is set in a horizontal plane, thereby bringing the whole in close proximity to the heater located below and presently described. After each of these small pipes has been wound into the desired number of coils they extend upwardly as at 38, see Fig. 1, and all are connected to another header 39 from which latter header leads the end 23 of the larger or main coil 24. This latter coil is preferably wound into a conical shape with its axis in a vertical plane the lower convolution 25 of this main coil being connected to the discharge pipe 26, which leads out through the casing and may be of any desired length to reach over the discharge into a bowl or other suitable receptacle.

Gas is preferably employed as the heating agent in this device and to use which, I have prepared a burner formed of a casing having two hollow concentric rings 27 and 28 and connected with each other through the passage-way 29. This burner is located within and supported from the casing just below the coils 21, and is supplied with air and gas through the neck member 30 which in turn is connected to the double valve 31 of the plug cock type in which are provided two spaced apart openings 32 and 33 which control the water inlet 34 and the gas inlet 35, respectively. It will be noted that the water opening in this plug 40 is larger than the gas opening therein thus positively insuring that the water passageway will be open before the gas passageway, and closed after the gas passageway has been closed, to prevent any possibility of the heat remaining after the water has been drawn from the coils and to also prevent the fire from being turned on before the water has filled the coils.

A handle 36 is attached to the plug 31, whereby its movement controls both the heat and water supply. At 37 is a small pipe leading from the gas tube from the outside of the valve to the inside of the casing, thereby providing a pilot light adapted to ignite the gas automatically as soon as turned on.

I have thus described one illustrative embodiment of my invention but I desire it to be understood that although specific terms are employed they are used in a generic and descriptive sense, and not for the purpose of limitation, the scope of the invention being set forth in the following claims.

I claim:

1. A portable water heater comprising a casing, a burner in said casing, a main and an auxiliary tubular coil in said casing, said auxiliary coil being divided into a plurality of separate groups of convolutions, each group having a horizontal axis lying in proximity to said burner and having one end connected to the water inlet and its opposite end to the main coil.

2. A portable heater comprising a casing, a burner in said casing, a water inlet pipe, a main and an auxiliary tubular coil in said casing, said auxiliary coil being divided into a plurality of groups of convolutions of small tubing connected to said inlet pipe, the axes of said groups standing in a horizontal plane and in proximity to said heater, a main coil of larger tubing to which all of said auxiliary coils are connected, said main coil having a vertical axis and a discharge outlet.

3. A portable water heater comprising a casing, a water inlet pipe, a main heating coil of large tubing having a hot water discharge at one end, an auxiliary coil comprising a plurality of groups of convolutions of smaller tubing, each having a horizontal axis connected at one end to said inlet and at its opposite end to said main coil, a gas heater below and in proximity to said groups having a plurality of spaced apart series of separate fire jets, said smaller coils being located over the space between said series whereby the water of condensation may drip from said convolutions through said spaces without affecting the flame.

In testimony whereof I affix my signature in presence of two witnesses.

ALLAN E. REID.

Witnesses:
HOWARD E. BARLOW,
A. F. MACREADY.